United States Patent

[11] 3,617,330

[72] Inventor Gunter Peilstocker
 Krefeld-Bockum, Germany
[21] Appl. No. 855,015
[22] Filed Sept. 3, 1969
 Continuation-in-part of Ser. No. 711,175, March 7, 1968, abandoned
[45] Patented Nov. 2, 1971
[73] Assignee Farbenfabriken Bayer Aktiengesellschaft
 Leverkusen, Germany
[32] Priorities Mar. 9, 1967
[33] Germany
[31] P 16 94 137.0;
 Oct. 1, 1968, Germany, No. P 18 00 277.2
 Continuation-in-part of application Ser. No. 711,175, Mar. 7, 1968, now abandoned.

[54] MOULDINGS OF POLYCARBONATES WITH IMPROVED SURFACES AND PROCESS FOR THEIR PRODUCTION
 4 Claims, No Drawings
[52] U.S. Cl. .............................................. 117/33.3,
 260/45.8 N, 260/45.85, 260/45.95
[51] Int. Cl. ................................................... C08g 51/58,
 C08g 51/60
[50] Field of Search .................................... 260/45.85;
 117/33.3

[56] References Cited
UNITED STATES PATENTS

| | | | |
|---|---|---|---|
| 2,527,010 | 10/1950 | Jenner........................... | 117/33.3 |
| 3,043,709 | 7/1962 | Amborski..................... | 117/138.8 |
| 3,180,885 | 4/1965 | Nentwig et al................ | 260/465 |
| 3,215,724 | 11/1965 | Strobel et al.................. | 260/465 |
| 3,309,219 | 3/1967 | Etherington.................. | 117/33.3 |
| 3,322,719 | 5/1967 | Peilstocker.................... | 260/45.8 |

Primary Examiner—Donald E. Czaja
Assistant Examiner—R. A. White
Attorneys—Robert A. Gerlach and Sylvia Gosztonyi ABSTRACT: Shaped articles of high molecular weight thermoplastic polycarbonates having improved ultraviolet resistance have an ultraviolet absorber in an amount of from about 3 to about 30 grams per square meter dispersed to a depth of 5 to about 30μ from the surface, which is sealed, may be prepared, for example, by applying to the surface about 150 to about 300 cc./sq./m. of a solution containing from about 2.5 to about 10 percent by weight of an ultraviolet absorber in a mixture of one part by weight of 1,2-dichloropropane and about 1 to about 25 parts by weight of benzene or in a mixture of about 80 to about 20 percent by weight 1,2-dichloroethane or 1,2-dichloropropane and about 20 to about 80 percent by weight 1,1,2-trifluoro-1,2,2-trichloroethane or 1,1,2,2-tetrachloro-difluoroethane and then removing the solvent.

MOULDINGS OF POLYCARBONATES WITH IMPROVED SURFACES AND PROCESS FOR THEIR PRODUCTION

This invention relates to shaped polycarbonate articles having improved ultraviolet resistance and to a method of preparing the same and is a continuation-in-part of our copending application Ser. No. 711,175, filed Mar. 7, 1968, now abandoned.

It has been heretofore known that high molecular weight thermoplastic polycarbonates of bivalent phenols absorb ultraviolet rays to a large extent, the result being loss of properties to the polycarbonate itself. Following the practice of German Pat. No. 1,194,142, the effect of the ultraviolet on the polycarbonate can be reduced by incorporating suitable ultraviolet absorbers such as certain benzophenones, benzotriazols, derivatives thereof and the like to polycarbonates which have previously been rendered acidic. This ultraviolet stabilization does not suffice in the case of a prolonged or frequently repeated, extremely strong action of ultraviolet rays, especially under the simultaneous effect of elevated temperatures and of moisture, as will occur under special climatic conditions or, for example, when bowls or tubs are used as coverings for strong light sources with a high emission of ultraviolet rays, since the absorber concentration required for this purpose cannot be achieved in the synthetic material without damaging the synthetic material in other respects.

Coating the surfaces of moldings with coats of a sufficiently effective concentration of ultraviolet absorber, as has been carried out with more or less satisfactory results in the case of some other synthetic materials by applying suitable lacquer films or by covering with suitable foils, fails in this case, since such coatings on polycarbonates are not stable to extreme stresses of the type mentioned above, especially to high stresses through changes of temperature, which the polycarbonates as such are capable of withstanding.

It has previously been proposed in British Pat. specification No. 1,029,335 and Belgian Pat. specification No. 662,349 to treat the surfaces of polycarbonate moldings with dispersions of ultraviolet absorbers in oils or water. The ultraviolet absorber should diffuse into the outer surface layer of the moldings in a sufficient amount to provide a satisfactory protection against damage through ultraviolet irradiation. In the British patent specification it is stated (cf. page 4, lines 66-70) that such a surface improvement of moldings consisting of polycarbonates succeeds only with the aid of dispersions; if absorber solutions are used, crackings are said to occur due to stress corrosion, as is normally the manner in which solvents affect polycarbonate surfaces.

Admittedly, it may be possible with the aid of this method of treating the surfaces of polycarbonate moldings with ultraviolet absorber dispersions to achieve a protection of the moldings also against damage caused by strong and prolonged ultraviolet irradiation. However, even the moldings thus treated do not withstand in the long run the simultaneous effect of strong ultraviolet rays and moisture at elevated temperatures. It has been found that this is due to the roughening involved in this treatment, i.e. to the surfaces becoming porous.

It is therefore an object of this invention to provide shaped articles of thermoplastic polycarbonates having improved resistance against ultraviolet. It is another object of this invention to provide an improved method of preparing polycarbonate articles having high resistance against ultraviolet radiation. It is a further object of this invention to provide polycarbonate articles having incorporated therein ultraviolet absorbers in a unique manner that improves the ultraviolet resistance.

The foregoing objects and others which will become apparent from the following description are accomplished in accordance with the invention generally speaking by providing polycarbonate articles of bivalent phenols having dispersed from a depth of 5 to about 30 μ and preferably from about 10 to about 25 μ from the surface from about 3 to about 30 grams and preferably from about 6 to about 20 grams per square meter of surface of an ultraviolet absorber, the surface being virtually completely sealed.

The content of ultraviolet absorbers in the surface layers as characterized above in combination with the sealed surfaces has the effect that the moldings are not only protected against being damaged by strong and prolonged ultraviolet irradiation, but that they also withstand such an irradiation under the simultaneous effect of moisture at elevated temperatures up to about 130° to 140° C. without yellowing and without losing their impact strength and the gloss incident to the sealed surface.

The long duration of the useful life of moldings with surfaces improved according to the invention, even under extreme external influences, may be increased even further, particularly in respect of strong and prolonged ultraviolet irradiation, by improving, according to the invention, the surfaces of moldings made of polycarbonates which already contain ultraviolet absorbers in known manner and have been prepared, for example, according to the process of the German Pat. specification No. 1,194,142 mentioned above.

Moldings with surfaces improved according to the invention can subsequently be hot formed by known methods, for example by the compression molding, deep-drawing or draping processes.

The new moldings are primarily suitable for being used in places where extreme climatic influences are to be expected as well as, for example, for covering strong light sources with a high emission of ultraviolet rays, e.g. contemporary street lightings, where additional factors are that the polycarbonates are virtually colorless, optically clear and have a low absorption for optical rays in the visual wave range, on the one hand, and that they have a particularly high impact strength and are thus virtually unbreakable, on the other hand.

The moldings according to the invention, which have the improved surfaces characterized above, can be prepared, for example, by treating the moldings in known manner with an ultraviolet absorber dispersion and then sealing the surface pores, for example, by singeing or by slightly swelling the surfaces with suitable solvents and evaporating of the solvents.

A particularly advantageous process combining, as it were, the impregnation of the surface layers with the absorbers by treatment with suitable dispersions and the sealing of the pores by a temporary swelling of the surfaces consists according to the invention in that about 150 to about 300 cc. of a solution containing about 2.5 to about 10 percent by weight of UV-absorber in a mixture of one part by weight 1,2-dichloropropane and about 1 to about 25 parts by weight benzene or in a mixture of about 80 to about 20 percent by weight 1,2-dichloroethane or 1,2-dichloropropane and about 20 to about 80 percent by weight 1,1,2,2-trifluoro-1,2,2-trichloroethane or 1,1,2,2-tetrachloro-difluoroethane are applied per square meter of moulding surface or that the mouldings are dipped at room temperature for about 5 to 60 seconds into such a solution and the excess solution is then allowed to drip off, and the solvents then evaporated.

It has been found that, due to the selection of precisely this combination of solvents and to the conditions of treatment characterized above, the penetration of the solutions amounts to between about 5 to about 30 μ, preferably between about 10 and 25 μ, and that the dissolved ultraviolet absorber also diffuses into the surface layer where it is fixed, dissolved in the polycarbonate, without crystallizing out when the solvents are evaporated.

This depth of penetration suffices to ensure that the ultraviolet absorber cannot be mechanically removed from the treated surfaces, for example, by wiping it off, while, on the other hand, it is not so great as to give to rise to stress corrosion crackings.

Application of the absorber solution to the surfaces of the moldings in the stated amounts can be carried out by usual methods, such as pouring over or spraying the surfaces or by roll application.

The known tempering of the moldings prior to the treatment according to the invention is recommended for moldings in which strong internal tensions are present from their production.

In the method of this invention either virgin polycarbonate or polycarbonate which already contains different or the same ultraviolet absorbers incorporated by any of the known techniques including the dispersion technique mentioned above may be used in the practice of this invention.

Any suitable high molecular weight thermoplastic polycarbonate of bivalent phenols may be used in the present invention, such as, those prepared from bivalent phenols may be used in the present invention, such as, those prepared from bivalent phenols, such as resorcinol, hydroquinone, dihydroxydiphenyls and, in particular, bis-(hydroxyphenyl)-alkanes, -cycloalkanes, -sulphones, -sulphoxides, -ethers and -sulphides optionally in admixture with glycols, with carbonic acid derivatives such as diesters and dihalides, optionally also with the addition of small amounts of dicarboxylic acids or their ester-forming derivatives, and which have an average molecular weight of at least about 10,000, preferably between about 25,000 and 200,000. Any of the polycarbonates described in "Chemistry and Physics of Polycarbonates" by Hermann Schnell, Interscience Publishers (1964) and in "Polycarbonates" by William F. Christopher and Daniel W. Fox, Reinhold Publishing Corporation (1962) and in U.S. Pat. No. 3,028,365 may be used in the practice of this invention.

Any suitable ultraviolet absorber may be used, such as, for example, benzophenone derivatives, such as 2-hydroxy-4-methoxy-benzophenone, 2,4-dihydroxy-benzophenone, 2,2'-dihydroxy-4-methoxy-benzophenone, 2-hydroxy-4-n-octoxy-benzophenone, 2,2'-dihydroxy-4,4'-dimethoxy-benzophenone, 2-hydroxy-4-methoxy-4'-methyl-benzophenone, benzotriazole derivatives, such as, 2-(2'-hydroxy-5'-methylphenyl)-benzotriazole, 2-(2'-hydroxy-5'tert. butylphenyl)-benzotriazole, 2-(2-hydroxy-3'-methyl-5'-tert.-butylphenyl)-benzotriazole, 2-(2'-hydroxy-5'-cyclohexlphenyl)- benzotriazole, 2-(2'-hydroxy-3', 5'-dimethylphenyl)-benzotriazole, 2-(2'-hydroxy-5'-tert.-butylphenyl)-5-chloro-benzotriazole, 2-(2'-hydroxy-3'-di-tert.-butylphenyl)-benzotriazole and derivatives of crotonic acid, such as a-cyano-b-methyl-b-(p-methoxyphenyl)-crotonic acid methyl ester, a-cyano-b-N-2-methyl-indolinyl)-crotonic acid methyl ester and the like. It is to be understood that the invention is applicable to any ultraviolet absorber and that any one or combination of absorbers can be used in accordance with this invention.

The invention is further illustrated but is not intended to be limited by the following examples in which all parts are by weight unless otherwise specified.

EXAMPLE 1

An extruded sheet of bisphenol-A-polycarbonate with a relative viscosity of 1,320 (measured on a solution of 0.5 g. substance in 100 ml. methylene chloride at 25° C. and with the dimensions 300×300×4 mm. is dipped for 30 seconds into a solution of 1 part 1, 2-dichloropropane and 10 parts benzene, in which there are dissolved 5 percent by weight 2-(2'-hydroxy-3', 5'-di-tert.-butyl-phenyl)-benzotriazole, referred to the amount of solvents. When the excess solution has dripped off, the sheet is dried at about 70° C. for about 1 hour. The surface of the sheet has a high gloss and is clear-transparent.

Test samples are taken from this sheet in order to carry out ageing tests and tests for mechanical strength.

The test results show that neither yellowing nor a loss of surface gloss has occurred after 2 years' tropical weathering, 3,000 hours' weathering in a weather-o-meter and 2,000 hours' illumination with a 250 watt high pressure mercury vapor lamp at a distance of 5 cm. and at a relative humidity of 70 percent. The values for impact strength have remained unchanged.

EXAMPLE 2

From an extruded sheet of bisphenol-A-polycarbonate with a relative viscosity of 1,330 and 3 mm. thickness, a street light covering of the dimensions 50×60×15 cm. is produced by the vacuum deep-drawing process. The covering is tempered at about 130° C. for about 1 hour, and after cooling, dipped for about 30 seconds into a solution consisting of 1 part 1,2-dichloropropane and 14 parts benzene, which contains 3.5 percent by weight 2-(2'-hydroxy-3', 5'-di-tert.-butyl-phenyl)-benzotriazole, referred to the amount of solvents. After removal from the immersion bath, the residual adhering solution is centrifuged off and the light covering is dried at about 75° C. for about 1 hour. It is subsequently mounted on a street lamp fitted with 2×250 watt high pressure mercury vapor lamps. After 2 years' operation, the light covering shows neither yellowing nor a loss of surface gloss, light transmission or impact strength.

EXAMPLE 3

A casing with the dimensions 50×40×20 cm. produced by the injection molding process from bisphenol-A-polycarbonate, which has been colored white with 1.5 percent by weight rutile and has a relative viscosity of 1,300, is tempered at about 130° C. for about 1 hour and subsequently sprayed with a solution consisting of 1 part 1,2-dichloropropane and 18 parts benzene, in which there are dissolved about 3 percent by weight 2-(2'-hydroxy-5'-methylphenyl)-benzotriazole, referred to the amount of solvents. This application corresponds to an amount of 200 cc. of solution per square meter of surface. After drying in air at room temperature for about 4 hours, the casing is exposed to weathering for 3 years. No yellowing or loss of surface gloss appears after this time. A casing of the same type which has not been aftertreated exhibits strong yellowing and a substantial loss of gloss after the said weathering time.

EXAMPLE 4

An extruded sheet of bisphenol-A-polycarbonate with a relative viscosity of 1.32 and the dimensions 60×80×3 mm is dipped for about 15 seconds into a solution consisting of about 1 part 1, 2-dichloropropane and 8 parts benzene, which contains 3.5 percent 2,2'-dihydroxy-4-N-octoxy-benzophenone, referred to the amount of solvents. The sheet thus after treated is dried at about 50° C. for about 30 minutes and at 70° C. for about 30 minutes.

The sheet is heated to about 190° C. by infrared heating and then molded by the vacuum deep-drawing process into a box-shaped light covering of the dimensions 45×65×10 cm. After trimming the edge, the covering is mounted on a street lamp which is fitted with 2×250 watt high pressure mercury vapor lamps. After 3 years' testing, the light covering exhibits neither yellowing nor a loss of surface gloss or impact strength.

EXAMPLE 5

A plate extruded from bisphenol-A polycarbonate of a 0.5 viscosity of 1,320 (measured on a solution of 0.5g. of substance in 100 ml. methylene chloride at 25° C.) with the dimensions 300×300×4 mm. is dipped for 10 seconds into a solution containing 5 percent by weight 2-(2'-hydroxy-3', 5'-di-tert.-butylphenyl)-benzotriazole in a mixture of
- 40 parts by weight tetrachloro-difluoroethane and
- 60 parts by weight 1,2 -dichloroethane. When the excess solution has dripped off, the plate is dried in air at room temperature until the bulk of the solvent has evaporated. The residual solvents are then removed in a heated tunnel drier in which the temperature is gradually raised to 130° C. during the passage time of 40 minutes. The mouldings are then exposed to the same temperature for a further 25 minutes. The surface of the plate has a high gloss and is transparent.

Test pieces are taken from this plate in order to carry out aging tests and to test the mechanical strength.

The test results show that no yellowing or loss of surface gloss has occurred after 2 years' tropical weathering, 8,000 hours' illumination with a high pressure mercury vapor lamp of the type HQL/250 watt from a distance of 12 cm. at a relative atmospheric humidity of 70 percent. The values for impact strength are unchanged.

EXAMPLE 6

A street lamp covering with the dimensions 45×60×15 cm. is produced by the vacuum deep-drawing process from a plate of 3 mm. thickness extruded from bisphenol-A polycarbonate with a relative viscosity of 1,300. The lamp covering is cooled to room temperature and dipped for 15 seconds into a solution containing 3.5 percent by weight 2-(2'-hydroxy-3', 5'-di-tert.-butylphenyl) -benzotriazole in a mixture of 30 parts by weight trichloro-trifluoroethane and
70 parts by weight 1,2 -dichloroethane.

After withdrawal from the dipping, the excess solution is thrown off and the lamp covering is dried in air for 30 minutes. The residual amounts of solvent are then removed in a heated tunnel drier in which the temperature is gradually raised to 130° C. in the course of 40 minutes. The time of residence at 130° C. amounts to 25 minutes.

The surface of the street lamp covering has a high gloss and is transparent. It is subsequently mounted on a street lamp fitted with two 250 watt high pressure mercury vapor lamps. After 3 years' operating time, the lamp covering exhibits no yellowing or loss of surface gloss, light transmission or impact strength.

EXAMPLE 7

A casing of the dimensions 50+40×20 cm produced by the injection moulding process from bisphenol-A polycarbonate which has a relative viscosity of 1,300 and has been colored white by means of 1.5 percent by weight rutile is sprayed, after cooling to room temperature, with a solution containing 4.5 percent by weight 2 -(2 '-hydroxy-5'-methylphenyl)-benzotriazole in a mixture of 35 parts by weight tetrachloro-difluoroethane and
65 parts by weight 1,2-dichloroethane.

The flawless spray is achieved with 250 cc. of solution per square meter surface. This consumption consists of the part of the solution which adheres to the surface, the loss through dripping off, the loss through spraying past the edges, and the loss occurring through evaporation of the spray.

After drying, the casing is exposed to weathering in Bombay (India) facing South at an angle of 45° for 2 years.

No yellowing or loss of surface gloss has occurred after this time. A casing of the same type which has not been aftertreated exhibits, after the said time of weathering, strong yellowing of the surface and a high loss of gloss.

EXAMPLE 8

A plate of the dimensions 500×500×4 mm. extruded from a mixed polycarbonate obtained from 4 molar percent 4,4'-dihydroxy-3,3'5,5'-tetrabromo-diphenylpropane (tetrabromo-bisphenol-A)and 96 molar percent bisphenol-A, with a relative viscosity of 1,300 (measured on a solution of 1.5 g. of substance in 100 ml. methylene chloride at 25° C.), is dipped for 20 seconds into a solution containing 4 percent by weight 2,2'-dihydorxy-4-methoxy-benzophenone in a mixture of 35 parts by weight tetrachloro-difluoroethane and
65 parts by weight 1,2 -dichloroethane. The consumption of solution corresponds to 140 cc. referred to 1 square meter surface. The plate thus aftertreated is dried at 40° C. for 30 minutes and subsequently in a tunnel drier at 130° C. for 30 minutes. The surface of the plate has a high gloss and is transparent.

Test pieces are taken from this plate in order to carry out aging tests and to test the mechanical strength. The test results show that no yellowing or loss of surface gloss has occurred after 2 years' tropical weathering in Bombay facing South at an angle of 45° and after 5000 hours' weathering in a weatherometer. The values for impact strength are unchanged. A plate of the same type which has not been aftertreated exhibits strong yellowing of the surface and a very high loss of gloss after these weathering tests.

EXAMPLE 9

A circular disk of 50 cm. diameter is cut out of a plate extruded from bisphenol-A polycarbonate with a relative viscosity of 1.33 and a thickness of 3 mm. The disk is dipped for 15 seconds into a solution containing 5 percent by weight 2-(2'-hydroxy-3', 5'-diamyl)-benzotriazole in a mixture of 30 parts by weight trifluoro-dichloroethane and
70 parts by weight dichloroethane. The disk thus aftertreated is dried at 40° C. for 30 minutes and subsequently at 130° C. for 30 minutes. —

After heating the disk by infrared heating to 190° C, it is moulded by means of compressed air to produce a spherical cap with a radius $r=40$ cm.

After trimming the edge, the spherical cap is mounted as a covering on to a round street lamp which is fitted with a 250 watt high pressure mercury vapor lamp having a fluorescent coating.

After 3 years' operation, the lamp covering shows no yellowing or loss of surface gloss or impact strength.

A covering which has been produced in the same way but has not been after treated, and is mounted in the same manner on a street lamp with the same armature exhibits, after the same time of operation, an intolerable yellowing in combination with stress cracking and a very high loss of impact strength and surface gloss.

It is to be understood that the above examples are for the purpose of illustration and not limitation. Further, any thermoplastic polycarbonate may be stabilized using any ultraviolet absorber by practicing the process of this invention and other suitable materials may be substituted throughout the examples for those specified therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for the production of moldings of high molecular weight thermoplastic polycarbonates of bivalent phenols having dispersed to a depth of from about 5 to about $30\mu$ from the surface, from about 3 to about 30 grams per square meter of surface of an ultraviolet absorber, the surface being sealed, which comprises applying about 150 to about 300 cc. sq. m. of molding surface of a solution of about 2.5 to about 10 percent by weight of UV-absorber in a mixture of 1 part by weight of 1,2 -dichloropropane and from about 1 to about 25 parts by weight of benzene or in a mixture of about 80 to about 20 percent by weight 1,2 -dichloroethane or 1,2 -dichloropropane and about 20 to about 80 percent by weight of 1,1,2 -trifluoro-1,2,2 -trichloroethane or 1,1,2,2, -tetrachlorodifluoroethane and evaporating the solvents.

2. Process according to claim 1, wherein the mouldings are dipped for about 5 to about 50 seconds into the absorber containing solution and the excess solution is allowed to drip off prior to drying.

3. Process according to claim 1, wherein the mouldings have been tempered prior to being treated with the absorber containing solution.

4. Process according to claim 1, wherein the polycarbonate of which the mouldings consist already contains UV-absorbers prior to being treated with the absorber containing solution.

* * * * *

UNITED STATES PATENT OFFICE
CERTIFICATE OF CORRECTION

Patent No. 3,617,330    Dated November 2, 1971

Inventor(s) Gunter Peilstocker

It is certified that error appears in the above-identified patent and that said Letters Patent are hereby corrected as shown below:

Column 2, line 52, "1,1,2,2-trifluoro-" should read -- 1,1,2-trifluoro --. Column 3, line 12, cancel "may be"; cancel line 13; line 14, cancel "bivalent phenols,"; line 45, insert -- ( -- between "2" and "methyl". Column 4, line 60, "0.5" should read -- relative --. Column 5, line 15, "1,300" should read -- 1330 --; line 35, "50+" should read -- 50x --; line 65 "dihydorxy" should read -- dihydroxy --.

Signed and sealed this 14th day of November 1972.

(SEAL)
Attest:

EDWARD M. FLETCHER, JR.
Attesting Officer

ROBERT GOTTSCHALK
Commissioner of Patents